US012645261B2

(12) United States Patent
Zhang et al.

(10) Patent No.: US 12,645,261 B2
(45) Date of Patent: Jun. 2, 2026

(54) TECHNIQUES FOR PREVENTING DEFORMATION OF A SHAFT COVER OF AN ELECTRONIC DEVICE

(71) Applicant: HONOR DEVICE CO., LTD., Shenzhen (CN)

(72) Inventors: Yaolei Zhang, Shenzhen (CN); Bin Yan, Shenzhen (CN); Guotong Zhou, Shenzhen (CN); Wenlong Huo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 322 days.

(21) Appl. No.: 18/281,856

(22) PCT Filed: Jan. 9, 2023

(86) PCT No.: PCT/CN2023/071270
§ 371 (c)(1),
(2) Date: Sep. 13, 2023

(87) PCT Pub. No.: WO2023/138426
PCT Pub. Date: Jul. 27, 2023

(65) Prior Publication Data
US 2024/0160249 A1 May 16, 2024

(30) Foreign Application Priority Data

Jan. 18, 2022 (CN) .......................... 202210056594.2
Mar. 18, 2022 (CN) .......................... 202210269299.5

(51) Int. Cl.
*G06F 1/16* (2006.01)

(52) U.S. Cl.
CPC .......... *G06F 1/1656* (2013.01); *G06F 1/1652* (2013.01)

(58) Field of Classification Search
CPC .. G06F 1/1656; G06F 1/1652; H04M 1/0268; H04M 1/0214; H04M 1/185; H04M 1/0216
See application file for complete search history.

(56) References Cited

U.S. PATENT DOCUMENTS

| | | | |
|---|---|---|---|
| 10,536,566 | B1 | 1/2020 | Cheng |
| 11,086,500 | B2 | 8/2021 | Park et al. |
| (Continued) | | | |

FOREIGN PATENT DOCUMENTS

| | | | |
|---|---|---|---|
| CN | 205089106 U | * | 3/2016 |
| CN | 208656822 U | | 3/2019 |
| (Continued) | | | |

*Primary Examiner* — Allen L Parker
*Assistant Examiner* — Keon Kim
(74) *Attorney, Agent, or Firm* — WOMBLE BOND DICKINSON (US) LLP

(57) ABSTRACT

An electronic device is provided. The electronic device may be a mobile phone, a wearable device, a vehicle-mounted device, or another device. The electronic device in this application uses a design in which a base protrudes in a Y direction or is flush with a shaft cover, thereby improving structural rigidity. The base can effectively bear all or a part of impact force, thereby effectively ameliorating a problem that the shaft cover is deformed and a flexible screen is impacted, and improving shatter resistance of the entire electronic device.

20 Claims, 11 Drawing Sheets

(56)     References Cited

U.S. PATENT DOCUMENTS

| | | | |
|---|---|---|---|
| 11,960,331 B2 | 4/2024 | Hu et al. | |
| 11,977,421 B2 * | 5/2024 | Yang | E05D 11/082 |
| 12,256,033 B2 | 3/2025 | Fu et al. | |
| 2020/0409429 A1 * | 12/2020 | Hsu | E05D 11/06 |
| 2021/0240232 A1 | 8/2021 | Cheng et al. | |
| 2022/0104370 A1 * | 3/2022 | Wu | G06F 1/1681 |
| 2022/0248548 A1 | 8/2022 | Zhong et al. | |
| 2022/0303371 A1 * | 9/2022 | Liao | H04M 1/0268 |
| 2022/0400565 A1 * | 12/2022 | Shin | G06F 1/1681 |
| 2023/0075646 A1 * | 3/2023 | Niu | H04M 1/0268 |

FOREIGN PATENT DOCUMENTS

| | | | | |
|---|---|---|---|---|
| CN | 110714976 A | | 1/2020 | |
| CN | 110784567 A | | 2/2020 | |
| CN | 111107189 A | | 5/2020 | |
| CN | 210518451 U | | 5/2020 | |
| CN | 111766970 A | | 10/2020 | |
| CN | 112751951 A | | 5/2021 | |
| CN | 213245316 U | * | 5/2021 | |
| CN | 110460699 B | | 6/2021 | |
| CN | 113126338 A | | 7/2021 | |
| CN | 113168208 A | | 7/2021 | |
| CN | 113286023 A | | 8/2021 | |
| CN | 113470515 A | | 10/2021 | |
| CN | 113890910 A | | 1/2022 | |
| JP | 2005090641 A | * | 4/2005 | H04M 1/0216 |

* cited by examiner

200

302

TECHNIQUES FOR PREVENTING DEFORMATION OF A SHAFT COVER OF AN ELECTRONIC DEVICE

This application claims priority to Chinese Patent Application No. 202210056594.2, filed with the China National Intellectual Property Administration on Jan. 18, 2022, and entitled "ELECTRONIC DEVICE", and claims Chinese Patent Application No. 202210269299.5, filed with the China National Intellectual Property Administration on Mar. 18, 2022, and entitled "ELECTRONIC DEVICE", which are incorporated herein by reference in their entireties.

TECHNICAL FIELD

This application relates to the technical field of electronic devices, and in particular, to an electronic device.

BACKGROUND

As flexible screen technologies are gradually developing, foldable electronic devices emerge, and are increasingly more widely applied to the life field of people. Currently, a foldable electronic device usually cannot be normally folded and unfolded after falling off. Therefore, how to reduce influence of falling on normal operation of the foldable electronic device is one of technical issues of concern to a person skilled in the art.

SUMMARY

Embodiments of this application provide an electronic device. Therefore, a probability that a shaft cover is deformed due to falling off is low.

According to a first aspect, an embodiment of this application provides an electronic device, including a rotating shaft mechanism, two main body parts, and a flexible screen, where the rotating shaft mechanism includes a base and a shaft cover, both the two main body parts are rotatably connected to the base, so that the two main body parts are folded or unfolded relative to each other, and in a direction parallel to a rotating shaft direction, a distance between the base and the main body part is not greater than a distance between the shaft cover and the main body part. An entire end part of the base may pass through the shaft cover or pass through an upper end of the shaft cover, so that an outer end part of the base is exposed outside the shaft cover or is flush with an outer wall of the shaft cover. Certainly, a part of the end part of the base may alternatively pass through the shaft cover or pass through the upper end of the shaft cover. The foldable electronic device in this application uses a design in which the base protrudes in a Y direction or is flush with the shaft cover, thereby improving structural rigidity. The base can effectively bear all or a part of impact force, thereby effectively ameliorating a problem that the shaft cover is deformed and the flexible screen is impacted, and improving shatter resistance of the entire electronic device.

Based on the first aspect, this embodiment of this application further provides a first implementation of the first aspect.

The base includes a main body and a protruding part extending outward from a partial area of an end part of the main body, and at least a part of the protruding part extends to a location between the shaft cover and the main body part, or an outer end of the protruding part is flush with an outer wall of the shaft cover. In this embodiment, only a part of the end part of the base extends outside the shaft cover.

Based on the first implementation of the first aspect, this embodiment of this application further provides a second implementation of the first aspect.

The protruding part passes through the shaft cover and extends to a location between the shaft cover and the main body part. In this implementation, the shaft cover correspondingly has avoidance space for the protruding part to pass through. In this manner, mounting is flexible, and the base and the shaft cover may be as close as possible to each other, thereby reducing a height of the rotating shaft mechanism in a Z direction.

Based on the first implementation of the first aspect, this embodiment of this application further provides a third implementation of the first aspect.

A protrusion amount range in which the protruding part protrudes from the outer wall of the shaft cover is 0-0.5 mm. This value range can meet requirements of most foldable electronic devices.

Based on the first to the third implementations of the first aspect, this embodiment of this application further provides a fourth implementation of the first aspect.

There are one or more protruding parts. In this way, design flexibility can be greatly improved.

Based on the first aspect to the fourth implementation of the first aspect, this embodiment of this application further provides a fifth implementation of the first aspect.

A range of the distance between the base and the main body part is 0.01-0.5 mm.

Based on the first aspect to the fifth implementation of the first aspect, this embodiment of this application further provides a sixth implementation of the first aspect.

A range of the distance between the shaft cover and the main body part is 0.01-0.8 mm.

Based on the first to the sixth implementations of the first aspect, this embodiment of this application further provides a seventh implementation of the first aspect.

The rotating shaft mechanism further includes a guide component mounted on the shaft cover, configured to guide a bending part of the flexible screen to be folded and deformed, and in the direction parallel to the rotating shaft direction, a range of a gap between the base and the guide component is 0 mm to 0.2 mm.

Based on the first aspect and the first to the seventh implementations of the first aspect, this embodiment of this application further provides an eighth implementation of the first aspect.

The base further has a baffle wall structure, configured to limit a movement displacement amount of the shaft cover toward one side of the flexible screen, and in a folded state and in the direction parallel to the rotating shaft direction, a range of a gap between the baffle wall structure and the shaft cover is 0 mm to 0.3 mm.

Based on the eighth implementation of the first aspect, this embodiment of this application further provides a ninth implementation of the first aspect.

In a first direction, a range of a gap between the protruding part and the shaft cover is 0 mm to 0.4 mm, and the first direction is a direction that is perpendicular to a rotating shaft and that points to the flexible screen; or/and in the folded state and in a first direction, a range of a gap between the baffle wall structure and the shaft cover is 0 mm to 0.4 mm, and the first direction is a direction that is perpendicular to a rotating shaft and that points to the flexible screen. In this way, mounting of the base is facilitated, and interference between the base and the shaft cover is avoided. In addition, when the shaft cover has a deformation trend due to falling off, the base can also suppress deformation of the shaft cover in the first direction.

Based on the first aspect and the first to the eighth implementations of the first aspect, this embodiment of this application further provides a tenth implementation of the first aspect.

The main body part includes a middle frame, and in the direction parallel to the rotating shaft direction, a distance between the base and the middle frame is not greater than a distance between the shaft cover and the middle frame.

Based on the tenth implementation, this embodiment of this application further provides an eleventh implementation of the first aspect.

An edge that is of the main body part and that is close to the end part of the base has a vertical wall, both the base and the shaft cover are located on an inner side of the vertical wall, and a distance between the base and the vertical wall is not greater than a distance between the shaft cover and the vertical wall.

Based on the tenth implementation, this embodiment of this application further provides a twelfth implementation of the first aspect.

The baffle wall structure is a vertical plane or an inclined plane, and an abutment plane that fits the baffle wall structure is disposed on the shaft cover. In this way, even if the shaft cover bears a part of impact force, a deformation amount is reduced due to support of the baffle wall structure of the base.

BRIEF DESCRIPTION OF DRAWINGS

FIG. 4-1 is a schematic enlarged view of a local part at a location Pin FIG. 2, where only main components such as a shaft cover, a main body part, and a base are shown;

FIG. 4-2 is a front view of FIG. 4-1;

DESCRIPTION OF EMBODIMENTS

Figure 9:
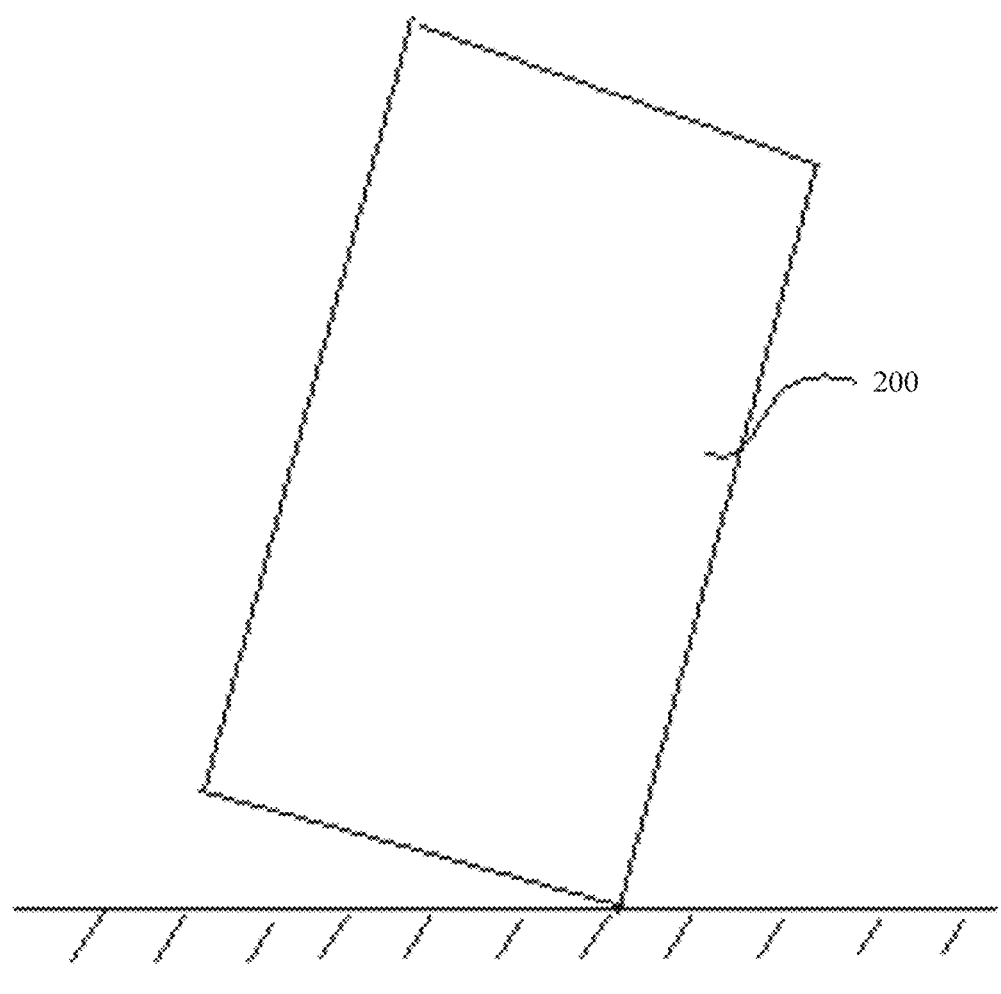
FIG. 9 is a schematic diagram of a falling state of a foldable electronic device.

For the phenomenon that a shaft cover is damaged due to falling off in the background, a large amount of experimental research is conducted in this application. A research finding is as follows: As shown in FIG. 9, most foldable electronic devices usually fall off to the ground in a posture shown in FIG. 9, and when a foldable electronic device falls off, a gap between a middle frame and a shaft cover is compressed when middle frames of two main body parts of the foldable electronic device are excessively deformed due to impact and cannot be restored, and consequently, the foldable electronic device cannot be folded or unfolded or folding and unfolding resistance is increased. In addition, the middle frame squeezes the shaft cover. In this case, the shaft cover is deformed in a foldable shaft direction. When a deformation amount is excessively large, a material yield of the shaft cover is irreversibly damaged. Consequently, reliability of the shaft cover and a structural part connected to the shaft cover is at risk.

Based on the foregoing research finding, this application further explores and proposes a technical solution that can effectively resolve the foregoing technical problem.

It should be noted that technical solutions and technical effects are described by using a foldable electronic device as an example in this specification. A person skilled in the art should understand that improvement to structures of a shaft cover and a base in this specification is not limited to being applied to the foldable electronic device, and may be further applied to another electronic device.

It should be noted that in this specification, one side that is of a shaft cover 301 and that faces a flexible screen is defined as an inner side, and correspondingly, the other side that faces a main body part is defined as an outer side.

The foldable electronic device provided in the embodiments of this application may be a mobile terminal, for example, a mobile phone, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), or may be a professional photography device, for example, a digital camera, a single-lens reflex camera/mirrorless camera, an action camera, a pan-tilt-zoom camera, or an unmanned aerial vehicle. A specific type of the foldable electronic device is not limited in the embodiments of this application. For ease of understanding, a mobile phone is used as an example of the foldable electronic device below for description.

Figure 1:
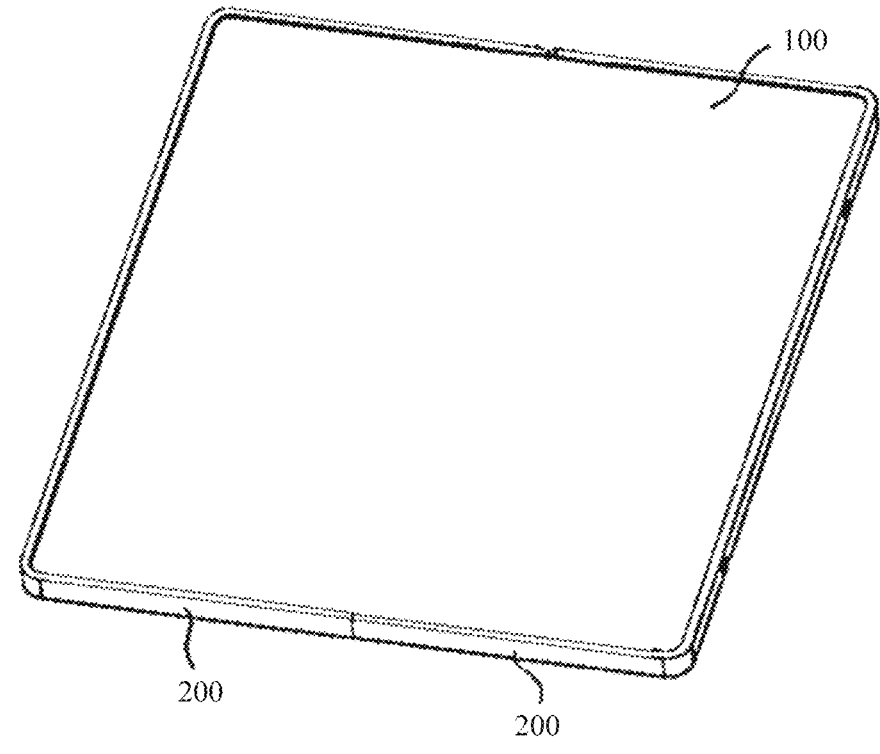
FIG. 1 is a schematic diagram of an overall structure of a foldable electronic device in an unfolded state according to an embodiment of this application.
Figure 2:
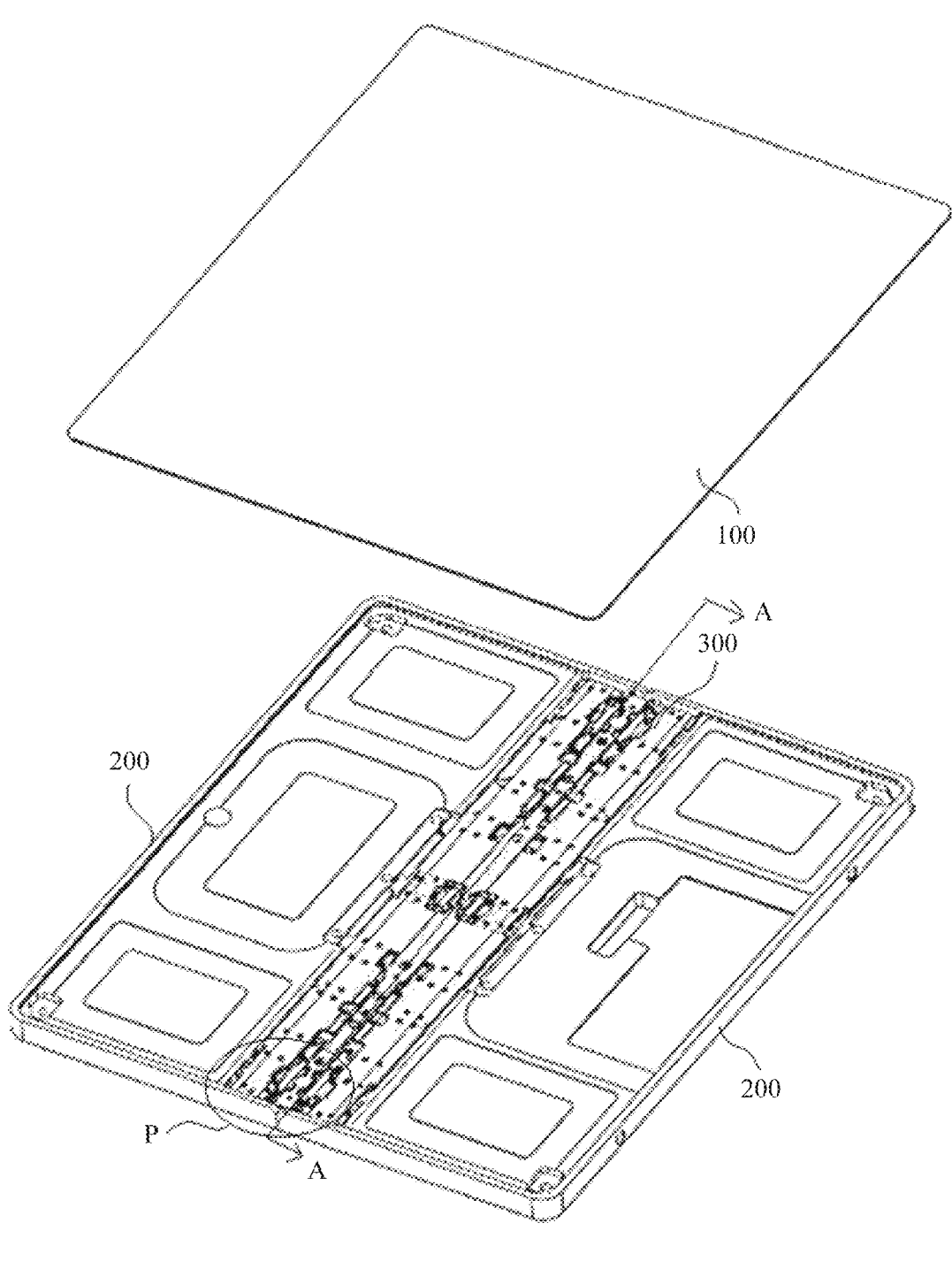
FIG. 2 is a schematic diagram showing that some components of the foldable electronic device shown in FIG. 1 are in a disassembled state.
Figure 3:
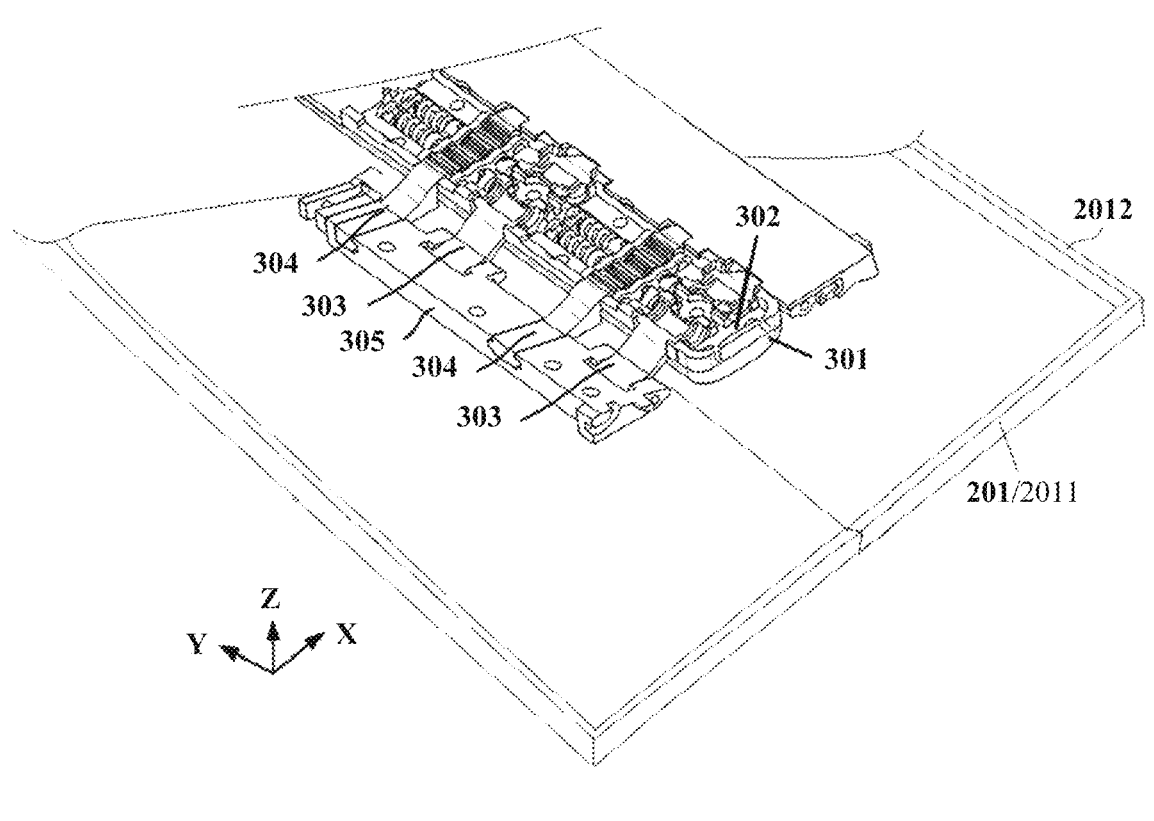
FIG. 3 is a schematic exploded view of a rotating shaft mechanism and a main body part according to an embodiment of this application.
Figure 10:
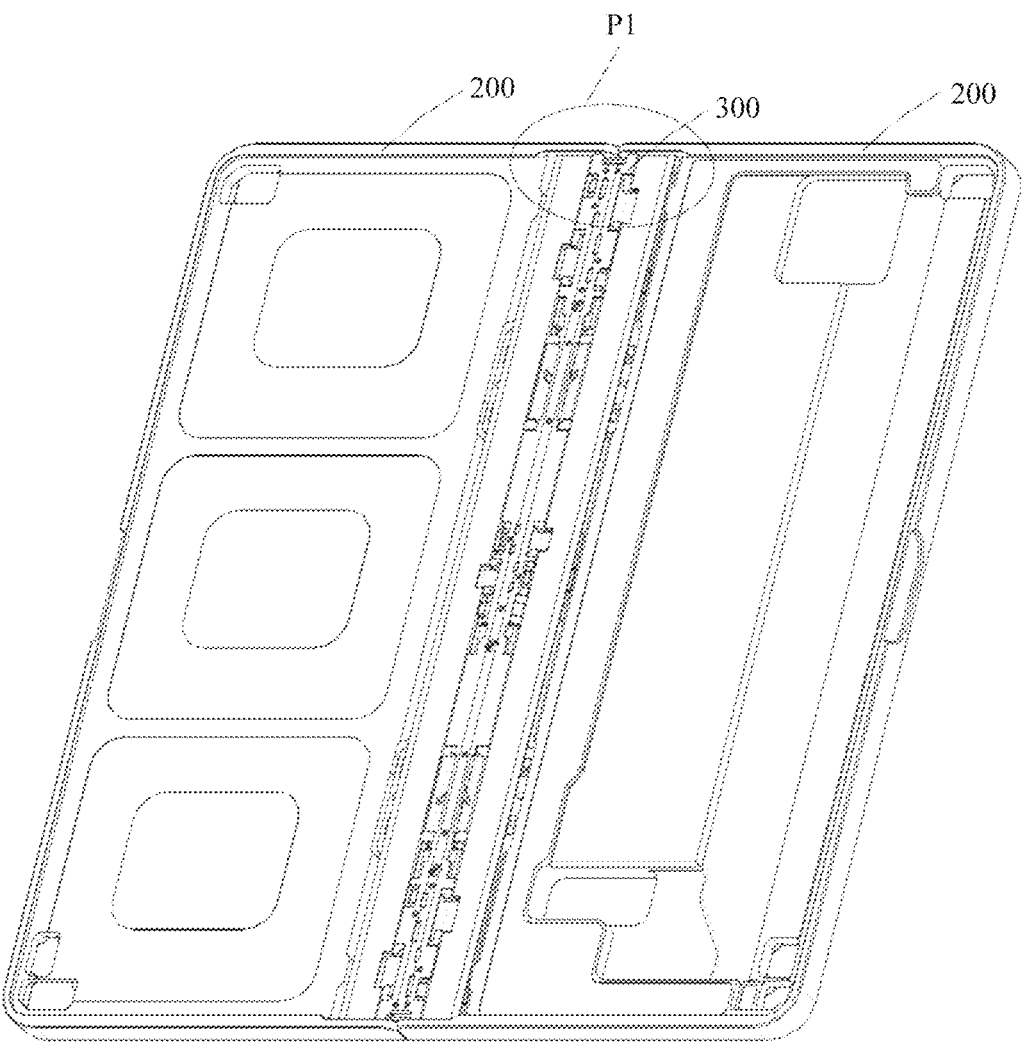
FIG. 10 is a schematic diagram of assembly of a main body part and a rotating shaft mechanism in FIG. 2.
Figure 11:
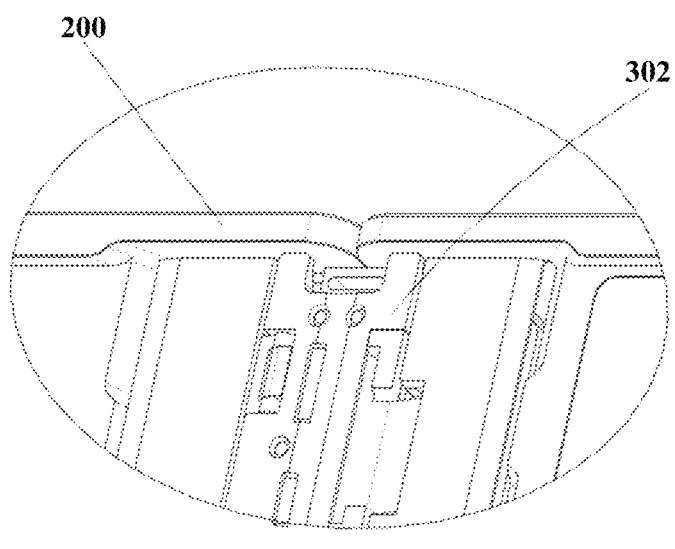
FIG. 11 is a schematic enlarged view of a location P1 in FIG. 10.

Refer to FIG. 1 to FIG. 3, FIG. 10, and FIG. 11. FIG. 1 is a schematic diagram of an overall structure of a foldable electronic device in an unfolded state according to an embodiment of this application. FIG. 2 is a schematic diagram showing that some components of the foldable electronic device shown in FIG. 1 are in a disassembled state. FIG. 3 is a schematic exploded view of a rotating shaft mechanism and a main body part according to an embodiment of this application. FIG. 10 is a schematic diagram of assembly of a main body part and a rotating shaft mechanism in FIG. 2. FIG. 11 is a schematic enlarged view of a location P1 in FIG. 10.

In this embodiment, the foldable electronic device includes a rotating shaft mechanism 300, two main body parts 200, and a flexible screen 100. The two main body parts 200 of the foldable electronic device are connected by using the rotating shaft mechanism 300, and the two main body parts 200 are rotated relative to each other by using the rotating shaft mechanism 300, to fold and unfold the foldable electronic device. Structures of the two main body parts 200 may be the same, or may not be entirely the same.

Specific structures of the two main body parts 200 may be determined based on a specific product, and are not specifically limited in this specification. The main body part 200 mainly provides a mounting basis and a protection function for the rotating shaft mechanism 300 and the flexible screen 100.

The flexible screen 100 includes a display module and a transparent cover plate. The display module can display an image, a video, and the like. The display module may include structural layers such as a touch control screen, a light-emitting layer, a backplane layer, and a substrate layer. A specific structure of the display module may be selected based on different products. The display module may use a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. The transparent cover plate covers an outer side of the display module to protect the display module. The transparent cover plate may be a glass cover plate. Certainly, the transparent cover plate may alternatively be another transparent material that can provide a protection function.

Refer to FIG. 3. In this application, the rotating shaft mechanism includes a shaft cover 301, a base 302 (also referred to as a "rotating shaft base"), a first swing arm 303, a second swing arm 304, and a connecting block 305. One end of the first swing arm 303 and one end of the second swing arm 304 may be rotatably connected to the base 302 or the shaft cover 301, and the other end of the first swing arm 303 and the other end of the second swing arm 304 are connected to the connecting block 305. A specific implementation in which the first swing arm 303 and the second swing arm 304 are rotatably connected to the base 302 is provided in this specification. The main body part 200 is connected to and positioned on the connecting block 305. In this way, when the first swing arm 303 and the second swing arm 304 rotate relative to the base, the first swing arm 303 and the second swing arm 304 can drive the main body part 200 connected to the connecting block 305 to rotate, thereby folding and unfolding the two main body parts 200.

A location of a rotation center of a rotation constraint between the rotating shaft base and one of the foregoing swing arms remains unchanged, to provide a location reference. The rotation constraint may be directly disposed for the rotating shaft base and the swing arms, or the rotation constraint may be disposed for the rotating shaft base and the swing arms by using another intermediate component. The shaft cover 301 is an exterior part (that is, an externally visible component) that wraps a rotating shaft movement mechanism in a folded state. The shaft cover 301 may alternatively wrap the rotating shaft movement mechanism together with the middle frame.

The shaft cover 301 is usually located on an outer side of the base 302, and one of functions of the shaft cover 301 is that the shaft cover 301 is an exterior part (that is, an externally visible component) that wraps the rotating shaft mechanism in the folded state of the electronic device. The shaft cover 301 may alternatively wrap the rotating shaft movement mechanism together with the middle frame. For example, the shaft cover 301 may wrap the base 302 and another component mounted on the base, to improve aesthetics of an appearance of the foldable electronic device. Sliding movement between the shaft cover 301 and the base

302 may be allowed in a Z direction, or the shaft cover 301 and the base 302 may be rigidly connected by using a locking screw, through welding, or in another manner. It should be noted that, in this application, a direction of a rotating shaft is defined as a Y direction, a direction that is perpendicular to a Y axis and that points to the flexible screen 100 is defined as a Z direction, and a direction perpendicular to a plane determined based on the Y direction and the Z direction is defined as an X direction. For each direction, refer to FIG. 3 for understanding.

A solution of this application provides a new design solution in which the shaft cover fits the base. Further refer to FIG. 4-1, FIG. 4-2, and FIG. 5. The base 302 of the foldable electronic device in this application protrudes from or is flush with the shaft cover 301. To be specific, in the Y direction, a gap A between the base 302 and the middle frame 201 is not greater than a gap B between the shaft cover 301 and the middle frame 201. In other words, in this application, a distance A between the base 302 and the main body part 200 is not greater than a distance B between the shaft cover 301 and the main body part 200, that is, the distance A is less than or equal to the distance B. In this application, FIG. 4-1 to FIG. 7 show specific embodiments in which the distance A is less than the distance B.

The foldable electronic device in this application uses a design in which the base 302 protrudes in the Y direction or is flush with the shaft cover 301, thereby improving structural rigidity. The base 302 can effectively bear all or a part of impact force, thereby effectively ameliorating a problem that the shaft cover 301 is deformed and the flexible screen 100 is impacted, and improving shatter resistance of the entire electronic device.

In an example, a range of the distance A is approximately 0.01-0.5 mm, a range of the distance B is approximately 0.01-0.8 mm, and a protrusion amount C of the base 302 protruding from an outer wall of the shaft cover is approximately 0-0.5 mm.

Figures 1, 4:
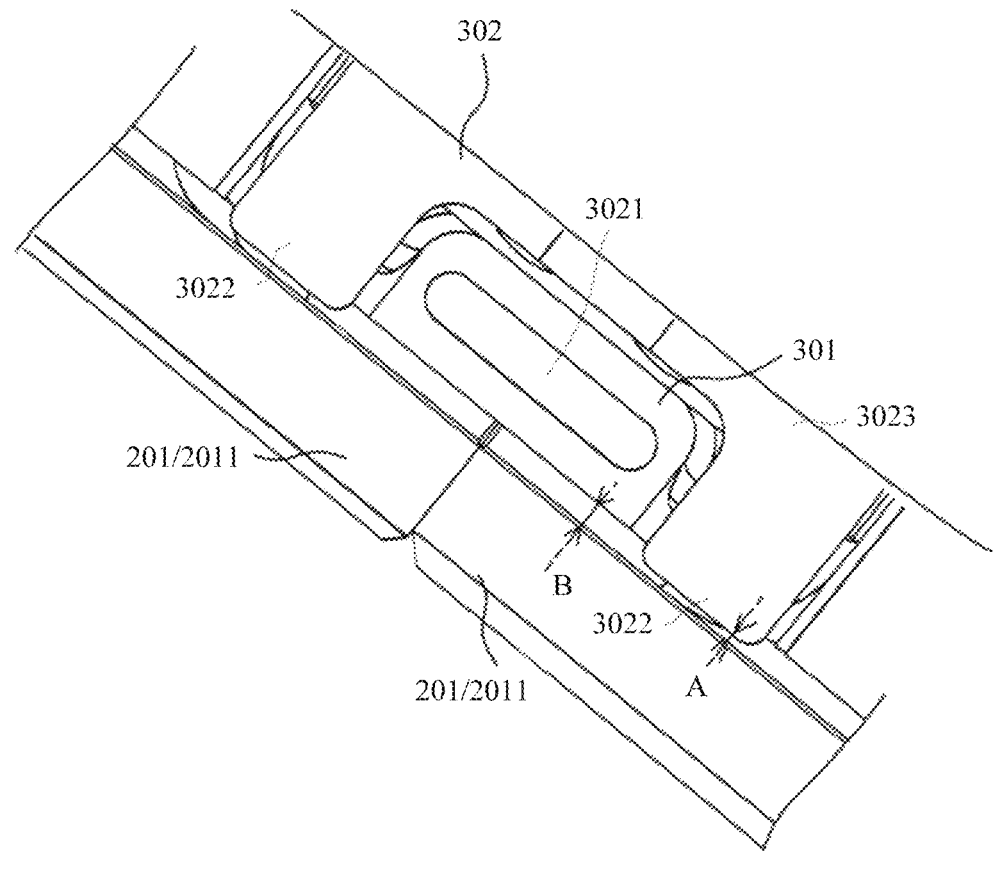
Figures 2, 4:
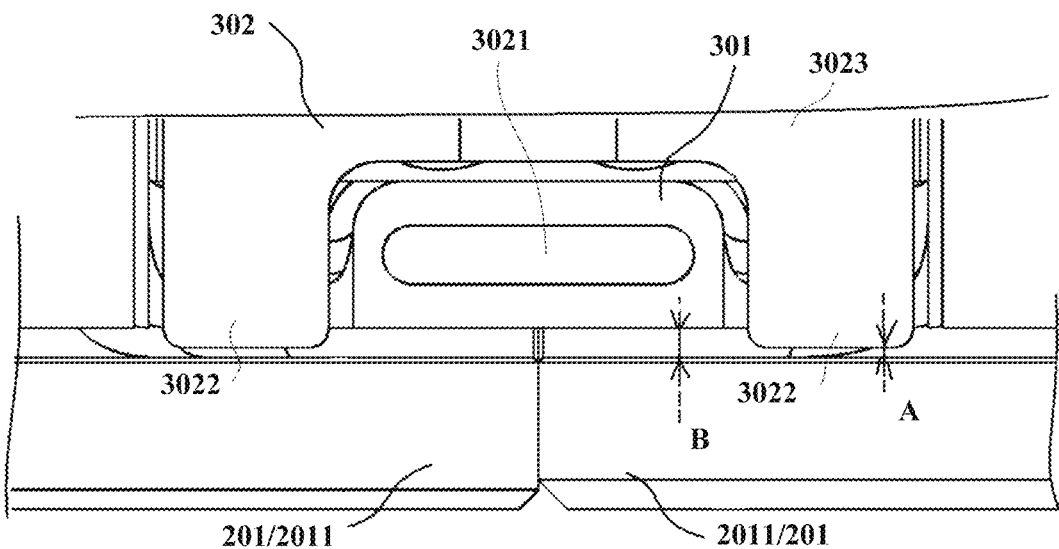
Figure 7:
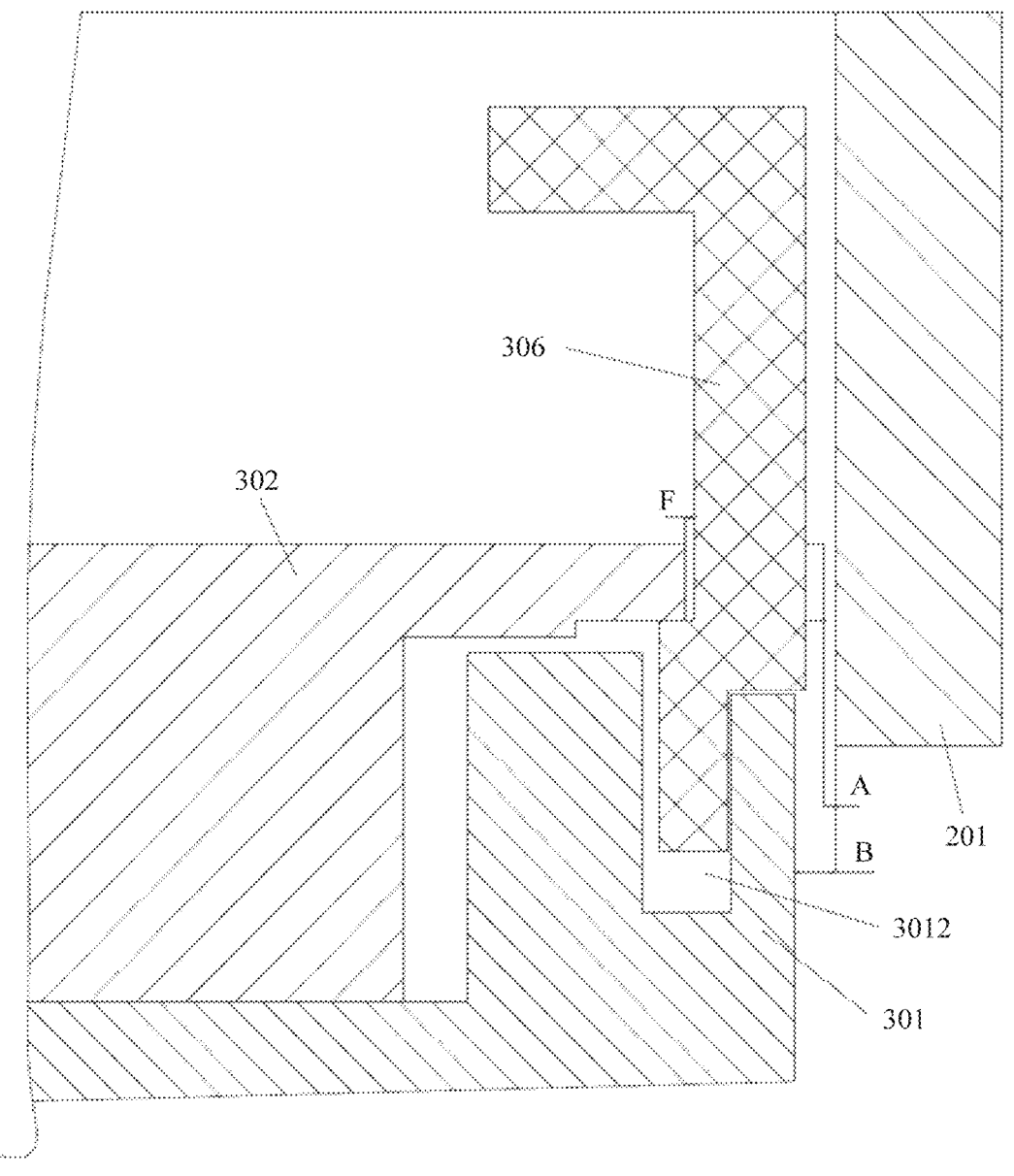
FIG. 7 is a schematic section view of a location relationship of a shaft cover, a main body part, and a base according to a third embodiment of this application.
Figure 8:
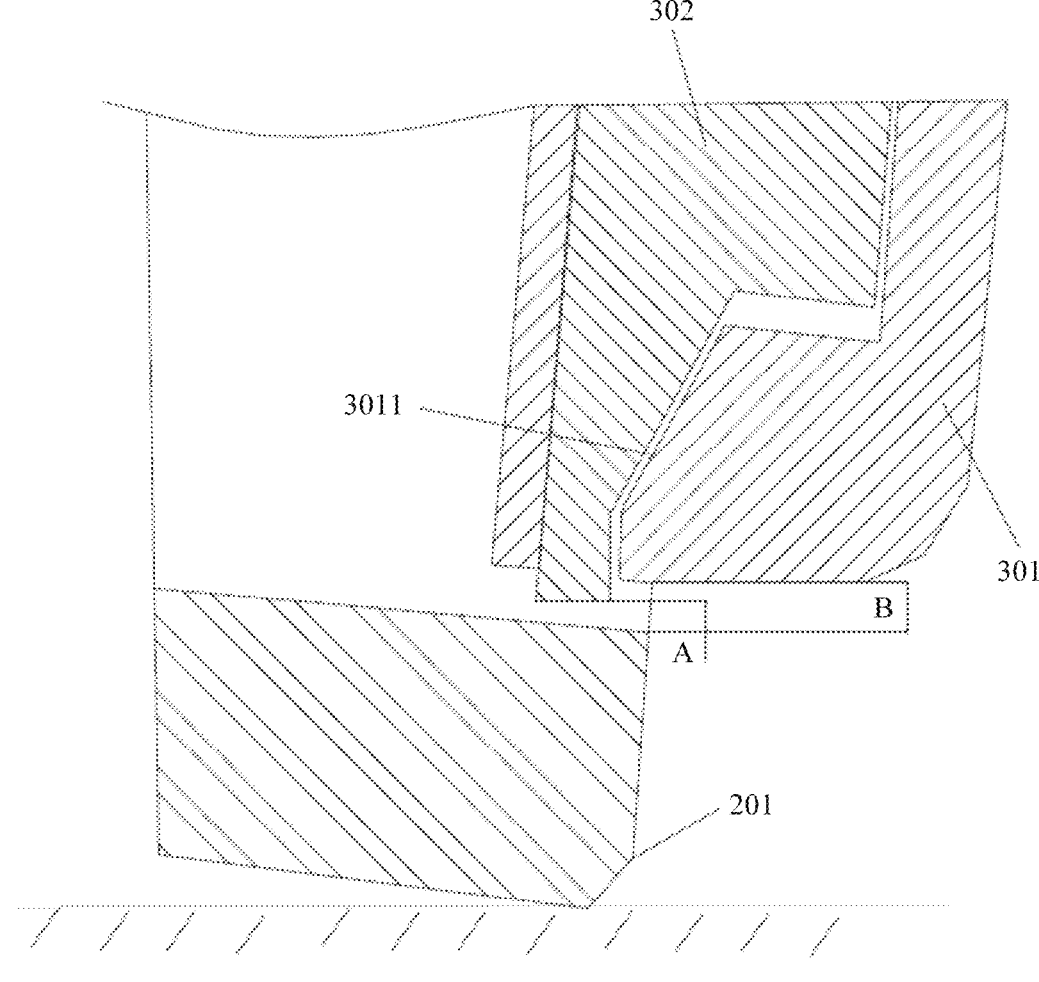
FIG. 8 is a schematic diagram of a location of each main component relative to the ground that exists when a foldable electronic device falls off according to an embodiment of this application.

As shown in FIG. 4-1 to FIG. 7, when the base 302 protrudes from the shaft cover 301 (that is, C>0), with reference to FIG. 8, after the foldable electronic device falls off in the folded state, the middle frame 201 of the main body part 200 first squeezes the base 302 after being impacted, and the shaft cover 301 is not squeezed or bears reduced squeezing force. In other words, the base 302 first in contact with the middle frame 201 consumes all falling impact force or consumes a large part of the falling impact force. In this way, the shaft cover 301 can also be entirely free from contact with the middle frame 201 to avoid the falling impact force, or even if the shaft cover 301 is in contact with the middle frame 201, the shaft cover 301 bears weak impact force. Therefore, the problem that the shaft cover 301 is deformed and the flexible screen 100 is impacted is effectively ameliorated. In addition, it should be noted that after the middle frame 201 is impacted in the Y direction, the base 302 bears positive pressure. An anti-pressure capability of a material is stronger than an anti-bending capability, and therefore, the base 302 is capable of bearing all or a part of impact force, thereby reducing a deformation amount.

When the base 302 is flush with the shaft cover 301 (that is, C=0), that is, when an end part of the base 302 is flush with the outer wall of the shaft cover 301, after the foldable electronic device falls off in the folded state, the middle frame 201 simultaneously squeezes to the base 302 and the shaft cover 301 after being impacted. In other words, the falling impact force is born by both the base 302 and the shaft cover 301 in this case, and the base 302 can effectively share a part of the impact force. Compared with the conventional technology in which the shaft cover 301 bears the falling impact force alone, in this example of this application, the shaft cover 301 bears only a part of the impact force. Therefore, the problem that the shaft cover 301 is deformed and the flexible screen is impacted can also be effectively ameliorated.

Figure 5:
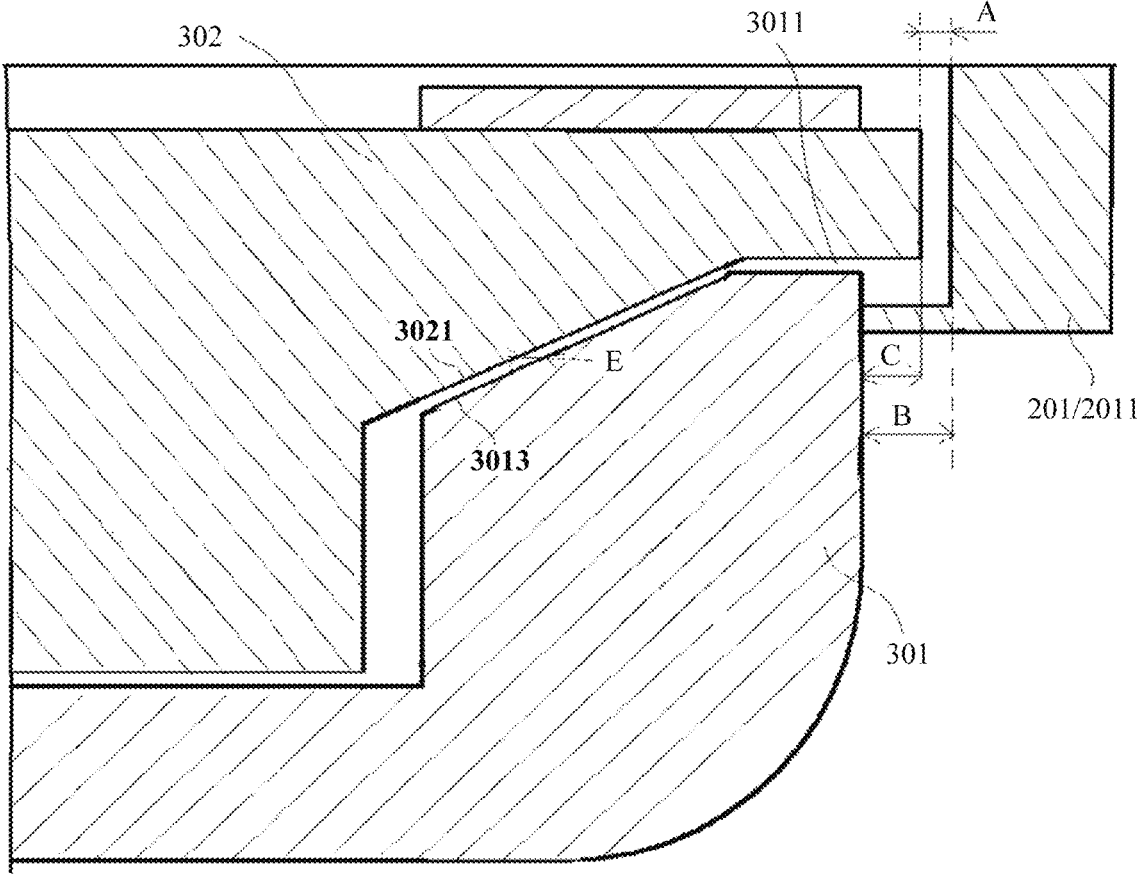
FIG. 5 is a section view in a direction A-A of FIG. 2.

Refer to FIG. 3 to FIG. 5 for understanding. In a specific example, edges of the middle frame 201 of the main body part 200 that are close to two end parts of the base 302 each have a vertical wall, both the base 302 and the shaft cover 301 are located on an inner side of the vertical wall, and a distance between the base 302 and the vertical wall is not greater than a distance between the shaft cover 301 and the vertical wall. As shown in FIG. 3, in the two middle frames 201, in addition to two adjacent side edges that are parallel to a rotating shaft direction, other three side edges of each of the two middle frames 201 each have a vertical wall: a first vertical wall 2012 extending in a direction parallel to the rotating shaft direction, and two second vertical walls 2011 that are located on two ends of the first vertical wall 2012 and that extend in a direction perpendicular to the rotating shaft direction. FIG. 3 shows only one second vertical wall 2011. With reference to FIG. 2 and FIG. 10, it is not difficult for a person skilled in the art to understand that the middle frame 201 also has one second vertical wall 2011 on another side of the first vertical wall 2012. In this way, space enclosed by all first vertical walls 2012 and all second vertical walls 2011 of the two middle frames 201 can be used to mount other components of the electronic device, and the vertical walls can also protect the components.

In the foregoing example, the second vertical wall 2011 is closer to an end part that is of the base 302 and that is on this side than to the shaft cover 301, or is equidistant from the base 302 and the shaft cover 301.

In a specific example, the middle frame 201 may include a border close to a screen, and the border may be located on an outer side of an end part of the shaft cover 301. A distance between the base 302 and the middle frame 201 is a distance between the base 302 and the border. Similarly, a distance between the shaft cover 301 and the border is a distance between the shaft cover 301 and the middle frame 201. In other words, the border part forms the second vertical wall 2011.

Certainly, the middle frame 201 may alternatively be a borderless structure.

Figure 6:
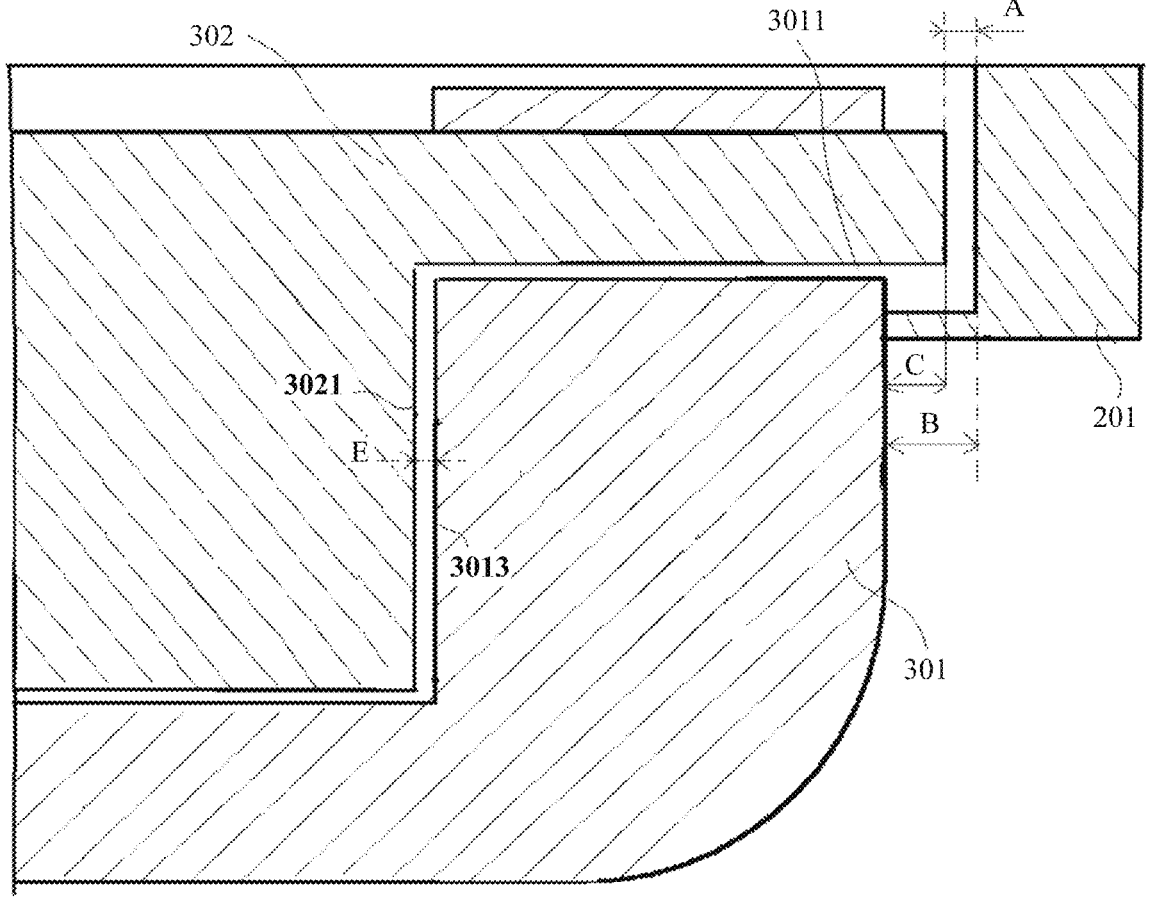
FIG. 6 is a schematic section view of a location relationship of a shaft cover, a main body part, and a base according to a second embodiment of this application.

To further improve deformation of the shaft cover 301, this application further proposes structural design solutions shown in FIG. 5 and FIG. 6. To be specific, a baffle wall structure 3012 is disposed on the base 302, and the baffle wall structure 3012 may be an inclined plane, as shown in FIG. 5. Certainly, the baffle wall structure 3012 may alternatively be a vertical plane, so that the shaft cover 301 is supported in the Y direction. Correspondingly, an abutment plane 3013 that fits the baffle wall structure may be disposed on the shaft cover 301, and the abutment plane 3013 may be an inclined plane or a vertical plane. In other words, "fitting" herein means that the abutment plane 3013 has approximately a same shape as the baffle wall structure 3012. To be specific, when the baffle wall structure is a vertical plane, the abutment plane 3013 of the shaft cover is also a vertical plane, and the two vertical planes are disposed opposite to each other; and when the baffle wall structure 3012 is an inclined plane that has an included angle with the Y direction, the abutment plane 3013 is also an inclined plane, and the baffle wall structure 3012 is approximately parallel to the abutment plane 3013, so that in each of the Y direction and the Z direction, there is a predetermined spacing between the baffle wall structure 3012 and the abutment plane 3013. It should be noted that the vertical plane herein is a plane parallel to the Z direction, as shown in FIG. 6. In this way, even if the shaft cover 301 bears a part of the impact force, the deformation amount is reduced due to support of the baffle wall structure of the base 302. The baffle wall structure 3012 includes but is not limited to the vertical baffle wall shown in FIG. 6 or the inclined plane baffle wall shown in FIG. 5. Any structure that can provide a supporting function in the Y direction falls within the protection scope of this application. In the folded state and in the Y direction, a gap E between the baffle wall structure of the shaft cover 301 and the base 302 is 0-0.3 mm. In addition, in the folded state and in the Z direction, there may also be a gap between the baffle wall structure and the shaft cover 301, and a range of the gap is 0-0.4 mm.

In addition, in the Z direction, there may also be a gap between the protruding part of the base 302 and the shaft cover 301, and a range of the gap is approximately 0-0.4 mm.

In a specific example, a guide component 306 is further mounted on the shaft cover 301 of the rotating shaft mechanism, and is configured to guide a bending part of the flexible screen 100 to be folded and deformed. The guide component may be a T-shaped block. Certainly, the guide component may alternatively be in another structural form. Refer to FIG. 4-1, FIG. 4-2, and FIG. 7. The guide component 306 is usually mounted on the shaft cover 301. A mounting hole 3021 may be disposed on the shaft cover 301, and a partial structure of the guide component 306 is mounted in the mounting hole 3021. To further reduce an amplitude of swinging that is of a structural part of the guide component 306 and that is caused by falling off, and reduce a risk that the structural part of the guide component 306 impacts the flexible screen, this application further proposes a structural design solution shown in FIG. 7. A gap that is in the Y direction and that is between the base 302 and the guide component connected to the shaft cover is extremely small, and a distance F between the base 302 and the guide component is approximately 0-0.20 mm. An advantage of the gap is that the amplitude of swinging that is of the guide component 306 and that is caused after the mobile phone falls off and impacts the ground is greatly reduced due to support and interception of the base 302, thereby reducing the risk that the structural part of the guide component 306 impacts the flexible screen 100.

It should be noted that, although only a size range is provided above, and other specific values within the size range are not listed one by one, a person skilled in the art should understand that the size range in this application refers to all values within the range including boundary values. For example, a range of a protrusion amount of the protruding part protruding from the outer wall of the shaft cover is 0-0.5 mm, and it should be understood that the protrusion amount of the protruding part protruding from the outer wall of the shaft cover may be any value between 0-0.5 mm (including boundary values 0 mm and 0.5 mm). The same is true for another value range. Details are not described herein again.

To adapt to disposition of the guide component, the protruding part 3022 on the base 302 may be separately located on two sides of a foldable shaft of the flexible screen 100, to avoid mounting space of the guide component. To be specific, the base includes a main body 3023, two protruding parts 3022 extend outward from a partial end part of the main body 3023, and there is a predetermined distance between the two protruding parts 3022.

There may be one, two, or more protruding parts 3022. FIG. 4-1 and FIG. 4-2 show examples in which two protruding parts 3022 are disposed.

For another structure of the foldable electronic device, refer to the conventional technology. Details are not described in this specification.

The principle and implementations of this application are described in this specification by using specific examples. The descriptions of the foregoing embodiments are merely used for helping understand the method and core ideas of this application. It should be noted that a person of ordinary skill in the art may make several improvements or modifications without departing from the principle of this application, and the improvements or modifications shall fall within the protection scope of this application.

What is claimed is:

1. An electronic device, comprising:
   a rotating shaft mechanism, two main body parts, and a flexible screen, wherein the rotating shaft mechanism comprises a base and a shaft cover, both the two main body parts are rotatably connected to the base, so that the two main body parts are folded or unfolded relative to each other, and in a direction parallel to a rotating shaft direction, a distance between the base and at least one of the two main body parts is not greater than a distance between the shaft cover and the at least one of the two main body parts,
   wherein the base comprises a main body and a protruding part extending outward from a partial area of an end part of the main body, the partial area of the end part of the main body exposes a mounting hole on the shaft cover, and at least a part of the protruding part extends to a location between the shaft cover and the at least one of the two main body parts, or an outer end of the protruding part is flush with an outer wall of the shaft cover.

2. The electronic device according to claim 1, wherein the protruding part passes through the shaft cover and extends to a location between the shaft cover and the at least one of the two main body parts.

3. The electronic device according to claim 1, wherein a protrusion amount range in which the protruding part protrudes from the outer wall of the shaft cover is 0-0.5 mm.

4. The electronic device according to claim 1, wherein there are one or more protruding parts.

5. The electronic device according to claim 1, wherein in the direction parallel to the rotating shaft direction, a range of the distance between the base and the at least one of the two main body parts is 0.01 mm-0.5 mm.

6. The electronic device according to claim 1, wherein in the direction parallel to the rotating shaft direction, a range of the distance between the shaft cover and the at least one of the two main body parts is 0.01 mm-0.8 mm.

7. The electronic device according to claim 1, wherein the rotating shaft mechanism further comprises a guide component mounted on the shaft cover, configured to guide a bending part of the flexible screen to be folded and deformed, and in the direction parallel to the rotating shaft direction, a range of a gap between the base and the guide component is 0 mm to 0.2 mm.

8. The electronic device according to claim 1, wherein the base further has a baffle wall structure, configured to limit a movement displacement amount of the shaft cover toward one side of the flexible screen, and in a folded state and in the direction parallel to the rotating shaft direction, a range of a gap between the baffle wall structure and the shaft cover is 0 mm to 0.3 mm.

9. The electronic device according to claim 8, wherein in the folded state and in a first direction, a range of a gap between the protruding part and the shaft cover is 0 mm to 0.4 mm, and the first direction is a direction that is perpendicular to a rotating shaft and that points to the flexible screen.

10. The electronic device according to claim 9, wherein in the folded state and in a first direction, a range of a gap between the baffle wall structure and the shaft cover is 0 mm to 0.4 mm, and the first direction is a direction that is perpendicular to a rotating shaft and that points to the flexible screen.

11. The electronic device according to claim 9, wherein the baffle wall structure is a vertical plane or an inclined plane, and an abutment plane that fits the baffle wall structure is disposed on the shaft cover.

12. The electronic device according to claim 1, wherein the at least one of the two main body parts comprises a middle frame, and in the direction parallel to the rotating shaft direction, a distance between the base and the middle frame is not greater than a distance between the shaft cover and the middle frame.

13. The electronic device according to claim 1, wherein an edge that is of the middle frame of the at least one of the two main body parts and that is close to the end part of the base has a vertical wall, both the base and the shaft cover are located on an inner side of the vertical wall, and a distance between the base and the vertical wall is not greater than a distance between the shaft cover and the vertical wall.

14. A foldable electronic device, comprising:
   two main body parts; and
   a rotating shaft mechanism comprising a base and a shaft cover, both the two main body parts rotatably connected to the base such that the two main body parts are folded or unfolded relative to each other, and in a direction parallel to a rotating shaft direction, and a distance between the base and at least one of the two main body parts is not greater than a distance between the shaft cover and the at least one of the two main body parts,
   wherein the base comprises a main body and a protruding part extending outward from a partial area of an end part of the main body, the partial area of the end part of the main body exposes a mounting hole on the shaft cover, and at least a part of the protruding part extends to a location between the shaft cover and the at least one of the two main body parts, or an outer end of the protruding part is flush with an outer wall of the shaft cover.

15. The foldable electronic device according to claim 14, wherein the protruding part passes through the shaft cover and extends to a location between the shaft cover and the at least one of the two main body parts.

16. The foldable electronic device according to claim 14, wherein a protrusion amount range in which the protruding part protrudes from the outer wall of the shaft cover is 0-0.5 mm.

17. The foldable electronic device according to claim 14, wherein there are one or more protruding parts.

18. The foldable electronic device according to claim 14, wherein in the direction parallel to the rotating shaft direction, a range of the distance between the base and the at least one of the two main body parts is 0.01 mm-0.5 mm.

19. The foldable electronic device according to claim 14, wherein in the direction parallel to the rotating shaft direction, a range of the distance between the shaft cover and the at least one of the two main body parts is 0.01 mm-0.8 mm.

20. The foldable electronic device according to claim 14, wherein the base further has a baffle wall structure, configured to limit a movement displacement amount of the shaft cover toward one side of a flexible screen, and in a folded state and in the direction parallel to the rotating shaft direction, a range of a gap between the baffle wall structure and the shaft cover is 0 mm to 0.3 mm.

\*　\*　\*　\*　\*